INVENTOR.
WILLIAM A. RHODES

3,363,176
REFLECTION READING ELECTROSCOPE
William A. Rhodes, 4421 N. 13th Place,
Phoenix, Ariz. 85014
Filed Jan. 22, 1963, Ser. No. 253,074
2 Claims. (Cl. 324—109)

My invention relates to an electroscope of the single or double vane type in combination with a new method for reading and charging same. The most familiar electroscope is of the metal leaf variety. Such instruments are used only where it is necessary to read the presence of electrostatic charges and the dissipation of such charges. They do not lend themselves to precision readings as would be desired when reading the rate of ionization from atomic radiation. Such instruments have been made and used; however, their readings are rough and not reliable since any calibrated scale for reading collapse rate of the vanes must be located at a distance from said vanes. It then becomes difficult if not impossible to align the eye every time in the same correct position for repeated precision readings. These instruments have suffered from the lack of a reference method. Introduction of a scale in near proximity to the charged elements is not practical since any such material, whether it be insulator or conductor, would render the instrument unstable. Such common instruments of the type I have described are not adaptable for serious precision measurements without the addition of other costly devices. Such expensive instruments are out of reach of the average individual.

The object of my invention is to make available to the average individual a low cost precision electroscope by providing for calibration and permanent reliability heretofore attainable only in expensive instruments.

Figure 1:
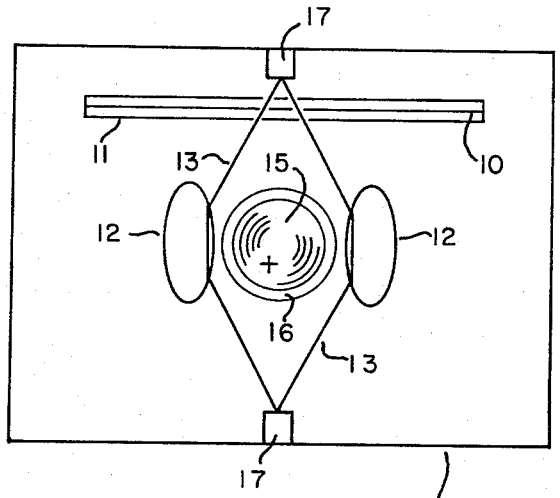
Figure 2:
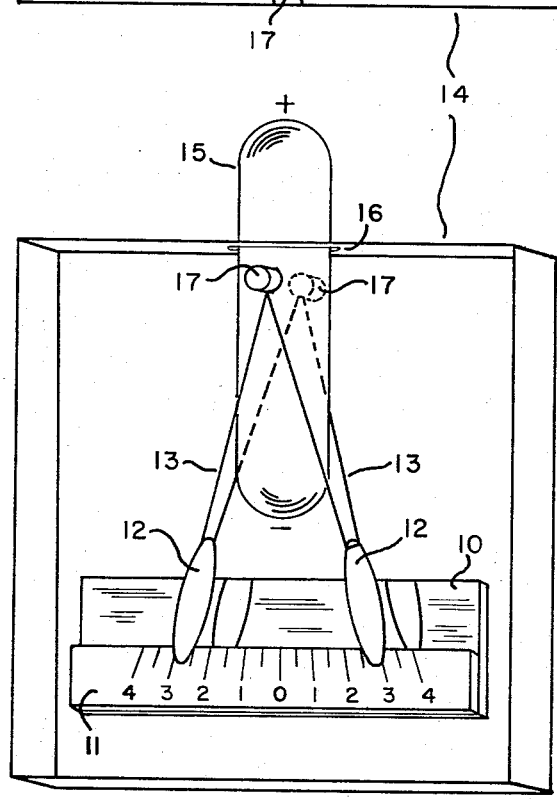

I have combined several old principles to form a new and novel combination as follows: FIGURE 1 is a plan view. FIGURE 2 is a front view. Part of my invention consists of placing a mirror 10 and a scale 11 behind the vanes 12 as shown in both figures. The eye is then placed so that either one or both vanes appear aligned with their respective images superimposed to obtain the narrowest visual combination of each vane and its image as shown slightly out of alignment in FIGURE 2. In other words the eye is moved until the on-edge image is hidden behind the on edge vane or vanes. The vanes are made to extend slightly over the calibrated scale area as shown in FIGURE 2, and are used directly as indicators. Only one reading is possible, the actual one, as there can be only one correct viewing position.

While I recognize that such a mirror has been used before for alignment purposes in instruments with indicator needles, such indicator needles represent a secondary element of such instruments. My application concerns the use of a mirror in conjunction with the primary element sensing means itself. In other words I use the sensing armature directly as a means for taking the reading. This I choose to call part one of my invention.

The common variety of electroscope whether it contains one or two movable elements usually embodies one or more insulators inserted through the wall of the housing chamber through which passes in turn a conductor or conductors whereby a static charge may be imparted to the vanes from the outside. Such insulators are subject to humidity and other contamination which causes electrical leakage. This is without doubt due to the relatively large area of exposed insulator surface versus short length.

Although the suspension I show is not the only one that could be used in my device, I prefer it for the many following reasons: (a) it utilizes suspension filaments 13 of high dielectric qualities with very long electrical path versus small cross section, reducing leakage substantially to zero, (b) the filaments can be permanently located inside a chamber away from contamination, (c) as shown at 17 in both figures, holds the vanes at a permanent required right angle with regard to reflector and scale, (d) provides an unobstructed path for the charging device to descend from above, (e) maintains the vanes in a stable position during approach of charging device. The previous disadvantage of such suspension system has been that the assemblies have had to be withdrawn from the chamber for charging, essentially dismantling the instrument each time it is charged. While I do not claim this type of suspension alone, I consider it essential to do so in combination with the other elements shown. Included in this is the charging means 15, FIGURE 2 as inserted through a port 16 in the chamber 14. When the charge from said means is transferred to the vane elements they fly apart as shown in FIGURE 2. The means is then withdrawn. When discharged, both vanes rest together at zero on the scale. The overall combination permits high reliability of calibration, reproduction in manufacture without re-calibration, symmetrical mechanical structure and housing form.

To expand on the previous paragraph it should be explained that while the vanes may be charged from any angle, through the sides or bottom of the chamber, it has been found that if a small charge is already present any attempt to approach the vanes with a similar charge usually results in one or both vanes and their suspensions gyrating wildly about to avoid the new charge. This can result in entanglement of the assembly, or discharge of the vanes through contact with the sides, or a condition where one must chase the vanes about with the charging source. In order to avoid contact with the chamber, said chamber would have to be unusually large and beyond the reach of the vanes.

Therefore as a second part of my invention I show, again in combination; electrically separated vanes 12, insulator filaments 13 and their suspension points 17 which allows the charging source to enter at port 16 from above. The vanes are thus held in place by gravity until an electrical charge is transferred from charging source 15. Even if a slight charge is already on vanes 12, the filaments 13 remain orderly and under tension before and after the new charge is transferred to the said vanes from above. And finally, the combination of this ideal charging approach from above would not be possible unless the suspension filaments were divided as shown and anchored at points 17, allowing an unimpeded path for charging from above.

In summary thereof, my invention consists in combination;

An enclosure chamber without electrically conductive means passing through the walls thereof, a conductive vane electroscope, a reflecting surface, a calibrated scale, a suspension system for said conductive vanes comprising insulating filaments disposed to hold the vanes at right angles to the reflector and scale, said filaments supported to permit a charging source to pass them from above without contact thereof to the electrical proximity of the vanes, and a source of static electricity capable of delivering a potential charge in the aforementioned manner.

Many variations of vanes and suspension systems in combination with reflector, scale and method of charging as described could be used, but such variations would still remain within the spirit of the invention.

I claim:
1. A reflection reading electroscope comprising the combination of: an enclosure with entry port in the top; two depending U shaped dielectric filaments having their respective ends attached to the inside of the top on a line on opposite sides of the entry port, each carrying a vertically extending conductive vane at its bottom portion; a scale and mirror extending parallel to and closely behind the path of movement of the conductive vanes, said vane movements being, due to their repulsion upon being charged by charging means extended through the entry port, whereby the position of the conductive vanes relative to the scale is accurately ascertained due to their images being superimposed on the scale and mirror in parallax free relationship.

2. A reflection reading electroscope comprising the combination of: an enclosure having an entry port in the top thereof; two depending U shaped dielectric filaments having their respective ends attached to the inside upper portion of said enclosure on a line on opposite sides of said entry port, each of said filaments carrying and suspending a vertically extending conductive vane at its bottom portion; a scale and a mirror extending parallel and closely behind the path of movement of said conductive vanes, said conductive vanes adapted for repulsion movement away from each other along a path due to being charged by charging means extended through said port; whereby the observed position of the conductive elements relative to the scale is accurately ascertained due to their images being superimposed on the scale and mirror falling into alignment relationship.

References Cited

UNITED STATES PATENTS

| | | | |
|---|---|---|---|
| 1,551,374 | 8/1925 | Davey | 324—109 |
| 2,482,801 | 9/1949 | Rouy | 324—109 |
| 2,753,463 | 7/1956 | Stout | 250—83.3 |
| 2,806,960 | 9/1957 | Henderson | 324—109 X |

RUDOLPH V. ROLINEC, *Primary Examiner.*

WALTER L. CARLSON, *Examiner.*